United States Patent [19]

Kaneko et al.

[11] Patent Number: 4,691,230

[45] Date of Patent: Sep. 1, 1987

[54] MOTION VECTOR DETECTION SYSTEM OF A MOVING OBJECT ON A SCREEN

[75] Inventors: Masahide Kaneko; Yoshinori Hatori; Tsutomu Miyasato, all of Kanagawa, Japan

[73] Assignee: Kokusai Denshin Denwa Co., Ltd., Tokyo, Japan

[21] Appl. No.: 833,311

[22] Filed: Feb. 25, 1986

[30] Foreign Application Priority Data

Mar. 4, 1985 [JP] Japan ................................ 60-41186

[51] Int. Cl.$^4$ ........................ H04N 7/18; H04N 7/12
[52] U.S. Cl. ..................................... 358/105; 358/136
[58] Field of Search ............... 358/105, 136, 133, 135, 358/138

[56] References Cited

U.S. PATENT DOCUMENTS

| | | | |
|---|---|---|---|
| 4,307,420 | 12/1981 | Ninomiya et al. | 358/136 |
| 4,460,923 | 7/1984 | Hirano et al. | 358/136 |
| 4,562,468 | 12/1985 | Koga | 358/136 |
| 4,591,908 | 5/1986 | Hirano | 358/136 |
| 4,591,909 | 5/1986 | Kuroda et al. | 358/136 |

Primary Examiner—James J. Groody
Assistant Examiner—Michael D. Parker
Attorney, Agent, or Firm—Armstrong, Nikaido, Marmelstein & Kubovcik

[57] ABSTRACT

A motion vector $V_x$ of a picture block X between a current input picture and a preceding frame picture is corrected to $V_p$, when said motion vector $V_x$ differs from a motion vector $V_r$ of adjacent blocks of said current input block, and ($S_{vx} < T_{h1}$, and $S_{vp} \geq T_{h2}$) is not satisfied, where $S_{vx}$ is a block difference of the block X between the current frame $F_0$ and the preceding frame $f_2$ for said motion vector $V_x$, $V_p$ is one of motion vectors $V_r$ giving the minimum value of $S_{vr}$, and $S_{vp}$ is a block difference for said $v_p$. The present invention provides correct motion vector of a moving object on a screen irrespective of noise in a picture signal and sudden intensity change. The present invention is applicable to a frame interpolation in a television standard system conversion system, and an efficient coding of a television signal.

5 Claims, 15 Drawing Figures

MOTION VECTOR DETECTION SYSTEM OF A MOVING OBJECT ON A SCREEN

BACKGROUND OF THE INVENTION

The present invention relates to a motion detection system which detects a moving object on a screen between adjacent frames in an image signal, like a television signal.

In a prior motion detection system for a television signal, an analog image signal is converted to a digital form through sampling and quantizing process, and each image signal is indicated by two dimensional sequences of a numerical information which is called a pixel (picture element).

FIG. 1 shows frames for explanation of detection of picture movement. In the figure, the symbol $F_0$ denotes the present field, $F_2$ denotes the second preceding field. As is known, interlace scanning is carried out so that a pair of fields provide a frame. In a motion detection system, a preceding frame which is a second preceding field is used.

It is denoted in FIG. 1 that $W(0,0)$ is the present input pixel, $W(-1,0)$ is the left adjacent pixel which is the preceding sampled point, $W(0,-1)$ is the pixel on the preceding scanning line and on the same sampling position as that of $W(0,0)$. In the field $F_2$, the pixel $X(0,0)$ locates at the same position as that of $W(0,0)$. The adjacent left pixel of $X(0,0)$ is $X(-1,0)$, the upper pixel is $X(0,-1)$, the right pixel is $X(1,0)$, and the lower pixel is $X(0,1)$. FIG. 1 shows that pixels are arranged on cross points of perpendicular coordinates, but other location like quincuncial location of pixels is of course possible.

First, m (sampling points) $\times$ n (scanning lines) number of pixels compose a block (m and n are integers). The detection of movement of an object in a picture is performed for a block, but not for a pixel. When a block is too small, the motion detection might have an error because of noise on a picture signal. When a block is too large, a fine movement of an object can not be detected. Further, when a block size is small, the number of blocks increases, the information quantity for transmitting movement of each block increases. Considering the above matters, the reasonable block size is 8 (sampling points) $\times$ 8 (scanning lines).

When the input block #(0,0)′ in the present field is provided, a block which has #(0,0) at the center, and (2k+1) cells in the longitudinal direction, and (2L+1) cells in the vertical direction, are defined as shown in FIG. 2.

A block difference B is then calculated to provide similarity measure between the input block in the present field and the block in the preceding picture. When the difference B is small, the similarity is high, and when the difference B is large, the similarity is low. The example of the equation for providing the block difference B is shown in the equation (1), which provides the square sum of the difference between the pixels in the blocks.

$$B(\#(0,0)', \#(0,0)) = \sum_{j=-n/2, n/2} \sum_{i=-m/2, m/2} |W(i,j) - X(i,j)|^2 \quad (1)$$

In that equation, $B(\#(0,0)', \#(0,0))$ is the block difference between a block #(0,0)′ and a block #(0,0). The difference between a block #(0,0)′ and another block is also calculated by replacing the other block for #(0,0).

Another equation for providing said difference B is shown in the equation (2), which provides the absolute sum of the difference between two blocks.

$$B(\#(0,0)', \#(0,0)) = \sum_{j=-n/2, n/2} \sum_{i=-m/2, m/2} [|W(i,j) - X(i,j)|] \quad (2)$$

The equation (2) is used in the explanation below.

The block differences $B(\#(0,0)', \#(-k,-L))$ through $B(\#(0,0)', \#(k,L))$ are calculated for all the blocks $\#(-k,-L)$ through $\#(k,L)$. Then, the value B is tested, and the block which has the minimum difference B is determined as the block which has the largest similarity. When more than two blocks have the same value of difference, the block which has the smaller block number is selected.

For instance, when $$B\#(0,0)', \#(2,0)) < B(\#(0,0)', \#(i,j)) \quad (3)$$

(where $i=-k,k$; $j=-L,L$)
is satisfied, the #(2,0) block is determined to be the most similar to the block #(0,0)′, and it is determined that the block #(2,0) moves to the block #(0,0)′ in a frame duration, that is to say, it is considered that the former block moves in the left direction by two pixels length in a frame duration.

The above prior art can detect the movement of a block, only when the intensity distribution of a block differs considerably from that of adjacent area, and both the fields have the related blocks.

However, said prior art has the disadvantage of having an error due to the following reasons.

(a) When the intensity change on a screen is small, the movement detection is affected by noise in an input signal.

(b) Even when the intensity change is large, the difference of intensity distribution between the related portions may largely depend upon the location of sampling points and the movement of an object.

(c) No block may be defined at the boundary between a moving object and a background.

An error in detection of a moving block causes deterioration of the picture quality when a picture is interpolated in a television standard conversion system using a motion detection system. An error also arises the problems in coding, and/or processing of motion pictures when a moving object is derived from an original picture.

SUMMARY OF THE INVENTION

It is an object, therefore, of the present invention to overcome the disadvantages and limitations of a prior motion detection system by providing a new and improved motion detection system.

The above and other objects are attained by a motion detection system comprising a picture memory (1) for storing at least a frame of picture signal, a motion vector detector (2) which looks for a block which is the most similar to a current input block having m $\times$ n pixels (m and n are integers) in a preceding frame stored in said picture memory (1), a motion vector memory unit (3) to store detected motion vectors for at most one frame duration, and a motion vector correction unit (4) for correcting the motion vector of current input block obtained in said motion vector detector (2) according to predetermined conditions by using motion vectors of adjacent blocks obtained from said motion vector memory unit (3).

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
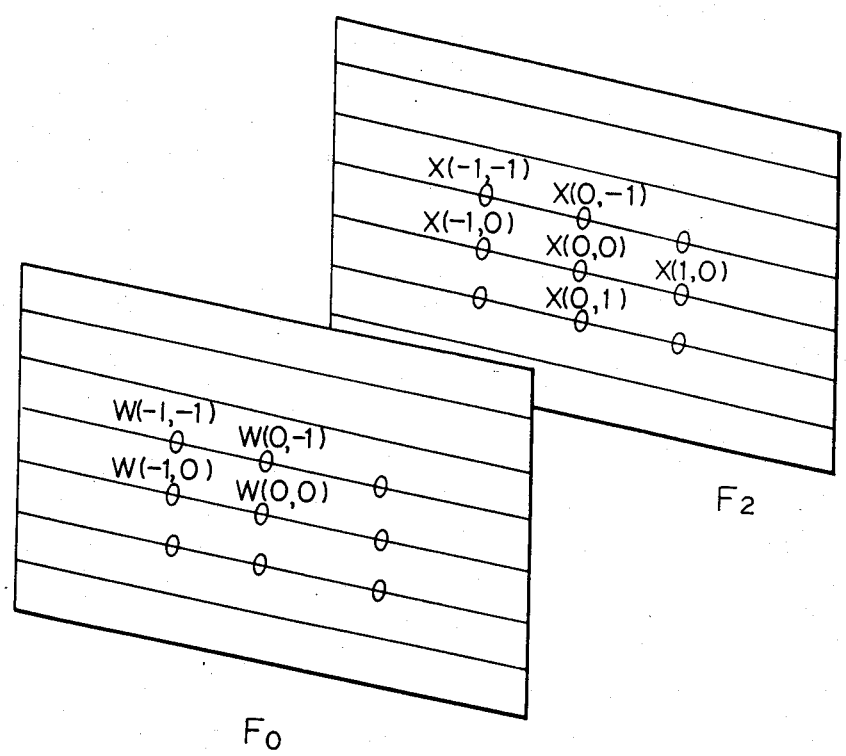
FIG. 1 shows a pair of fields between which an object moves.
Figure 2:
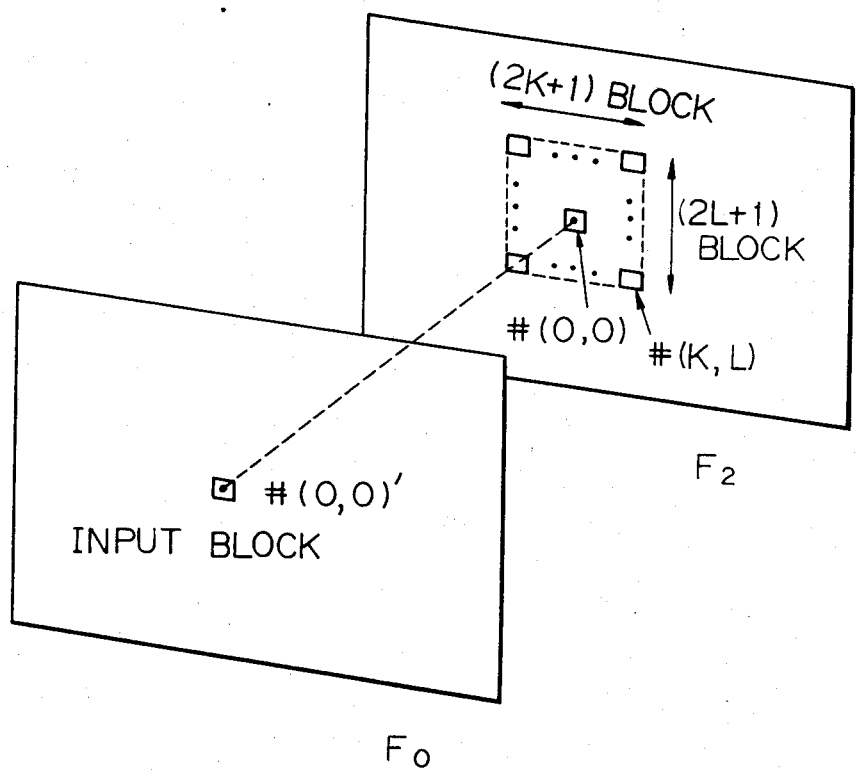
FIG. 2 shows a pair of fields showing the concept of a block which is subject to detection of movement.
Figure 3:
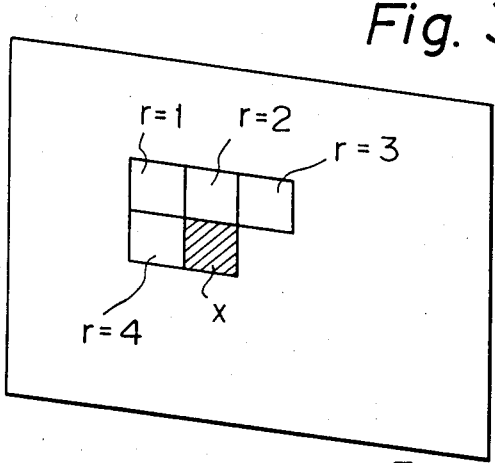
FIG. 3 shows blocks which are located next to the present block in the present field.

First, the basic idea of the present invention is described. FIG. 3 shows the block X, and the adjacent blocks 1,2,3 and 4 in the field $F_0$.

The following symbols are defined.

$V_x$; a motion vector relating to the block X, obtained by a prior art motion vector detector.

$V_r$; a motion vector of a block r located close to the block X (correction process has been performed).

$S_{V_x}$; a block difference for $V_x$ between present input $F_0$ and a preceding frame $F_2$.

$S_{V_r}$; a block difference between a block X in the field $F_0$ and a block which is apart by $V_r$ from the block X in the field $F_2$.

$V_p$; a motion vector which gives the minimum $S_{V_r}$ (p is one of r=1 through 4).

$S_{V_p}$; a block difference for $V_p$.

When $V_x$ is equal to one of $V_r$(r=1–4), it is determined that the motion vector for the block X is $V_x$. In other words, when there is a block which has the same motion vector around the block X, it is determined that the detection of the block is correct.

Next, it is considered the case that $V_x$ is equal to none of $V_r$ (r=1–4).

When $S_{V_x} < T_{h1}$ and $S_{V_p} \geq T_{h2}$ ($T_{h1} < T_{h2}$, $T_{h1}$ and $T_{h2}$ are thresholds) are satisfied, it is determined that the motion vector for the block X is $V_x$. In this case, although $V_x$ differs from the movement of the upper blocks and the left block, it is determined that the detection is correct, since (1) as the value $S_{V_x}$ is small, it is possible that the detection is correct, and (2) as the value $S_{V_p}$ is large, it is possible that the movement of the block X differs from those of the left block and the upper blocks.

When $S_{V_x} < T_{h1}$ and $S_{V_p} \geq T_{h2}$ are not satisfied, it is possible that the value $V_x$ is in error. Therefore, it is determined that $V_p$ is the motion vector for that block so that the motion vector coincides with the movement of the adjacent blocks.

In the above manner, it is possible to correct an error arising in the detection process of motion vectors.

The above concept of the present invention is summarized as follows.

First, it is intended to provide a motion vector which is similar to that of the adjacent blocks. Secondly, when a new moving object appears, or a block moves differently from that of the adjacent blocks, a correction according to the values of block differences of the adjacent blocks is performed. The above concept is shown in the table 1.

TABLE 1

| Correction of a motion vector | |
|---|---|
| | corrected result |
| $V_x = V_r$ (r = 1 through 4) | $V_x$ |
| $V_x = V_r$ $S_{V_x} < T_{h1}$, $S_{V_p} \geq T_{h2}$ (for all the r's) | $V_x$ |
| others | $V_p$ |

Some modification of the above concept is possible.

First, in the determination if $V_x$ coincides with $V_r$, $V_x = V_r$ is too strict, and some error may be allowed. For instance, when $V_r = (V_{r1}, V_{r2})$ is in the same direction as that of $V_x = (V_{x1}, V_{x2})$ within the error of $\pm 45/2$, and $V_{r1} = V_{x1} \pm 1$, $V_{r2} = V_{x2} \pm 1$ are satisfied, it may be determined that $V_x = V_r$ is satisfied.

Figure 4:
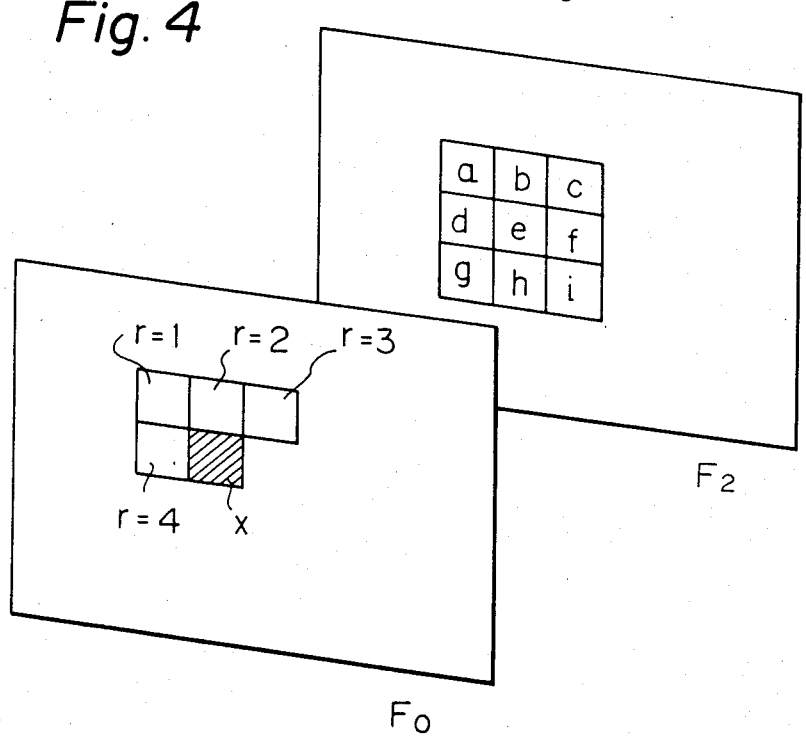
FIG. 4 shows the adjacent blocks in the present field and the second preceding field.

Secondly, as adjacent blocks, not only blocks r=1 through 4 in the field $F_0$, but also a block e (or all the blocks a through i, or the average of a through i) in the field $F_2$ may be considered as shown in FIG. 4.

Figure 5:
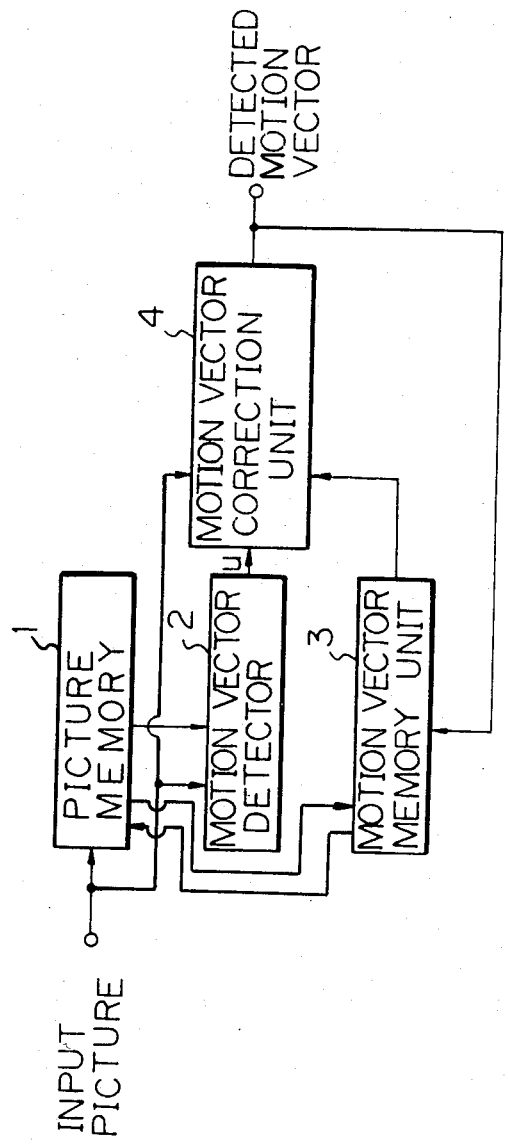
FIG. 5 is a block diagram of the motion detector according to the present invention.

FIG. 5 shows a block diagram of the motion vector detector according to the present invention. In the figure, the numeral 1 is a picture memory which stores a picture by at least one frame, 2 is a motion vector detector, which operates based upon a prior art motion vector detector (the equation (1) or (2)) to provide a motion vector by finding an area in the second preceding field relating to an input block, 3 is a motion vector memory unit which stores detected motion vectors by at most one frame, 4 is a motion vector correction (or adjust) unit to correct the motion vector which is obtained by the prior art motion vector detector 2. The presence of the motion vector correction unit 4 is the feature of the present invention.

Figure 6:
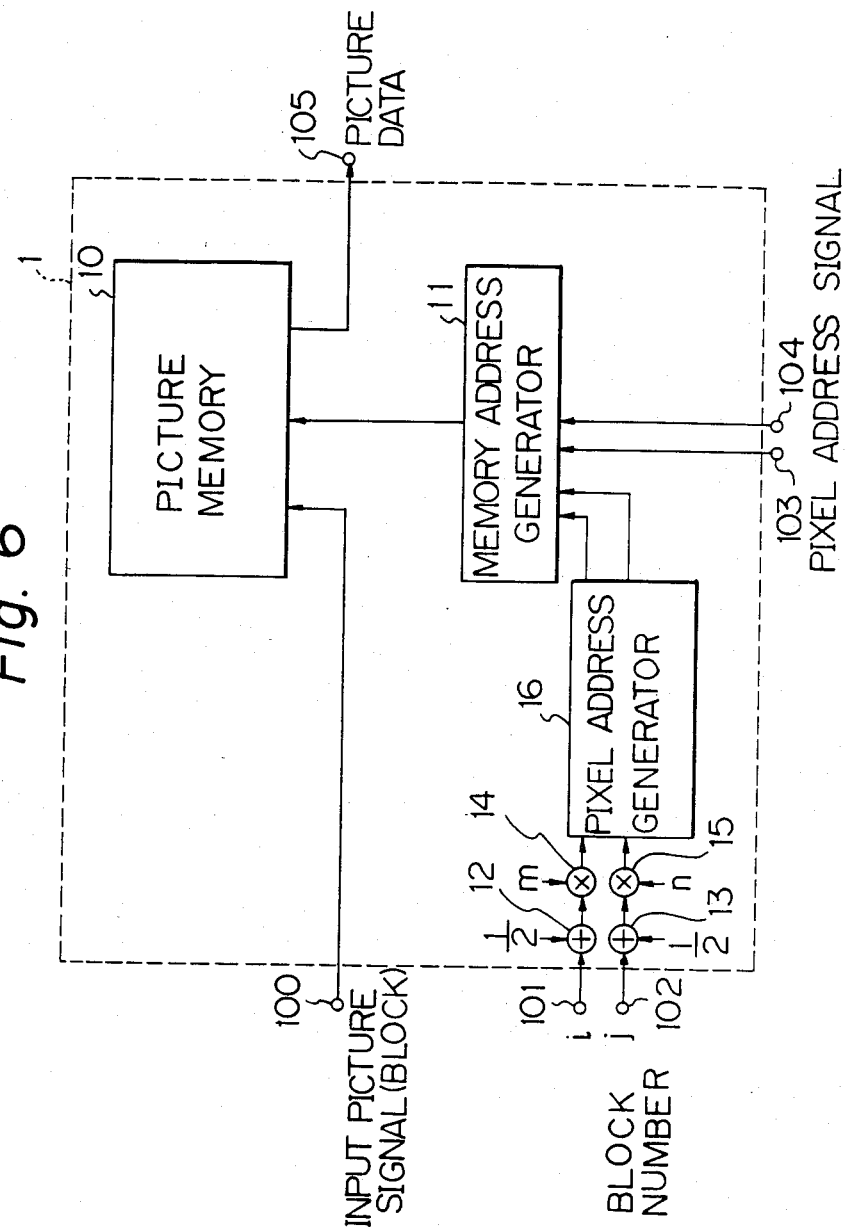
FIG. 6 is a block diagram of the picture memory in FIG. 5.

FIG. 6 is a block diagram of a picture memory 1 in FIG. 5. In FIG. 6, the numeral 10 is a picture memory, 11 is a memory address generator, 12 and 13 are adders, 14 and 15 are multipliers, 16 is a pixel address generator in a block, and 100 through 105 are terminals. A sampled input picture signal is applied to the input terminal 100 in a block form. The horizontal position i and the vertical position j of the present block in an input picture are applied to the terminals 101 and 102, respectively. The pixel address signals for reading a picture data out of a picture memory are applied to the terminals 103 and 104. The picture data read out of the picture memory 10 is applied to the output terminal 105.

The block numbers (horizontal position i and vertical position j) are converted to pixel addresses $x = (i + \frac{1}{2}) \times m$, $y = (j + \frac{1}{2}) \times n$, through the adders 12 and 13, and the multipliers 14 and 15, where m and n are length in the horizontal direction and vertical direction of a block. The pixel addresses x and y are applied to the pixel address generator 16 which sends addresses of each pixel in a block to the memory address generator 11.

Figure 7:
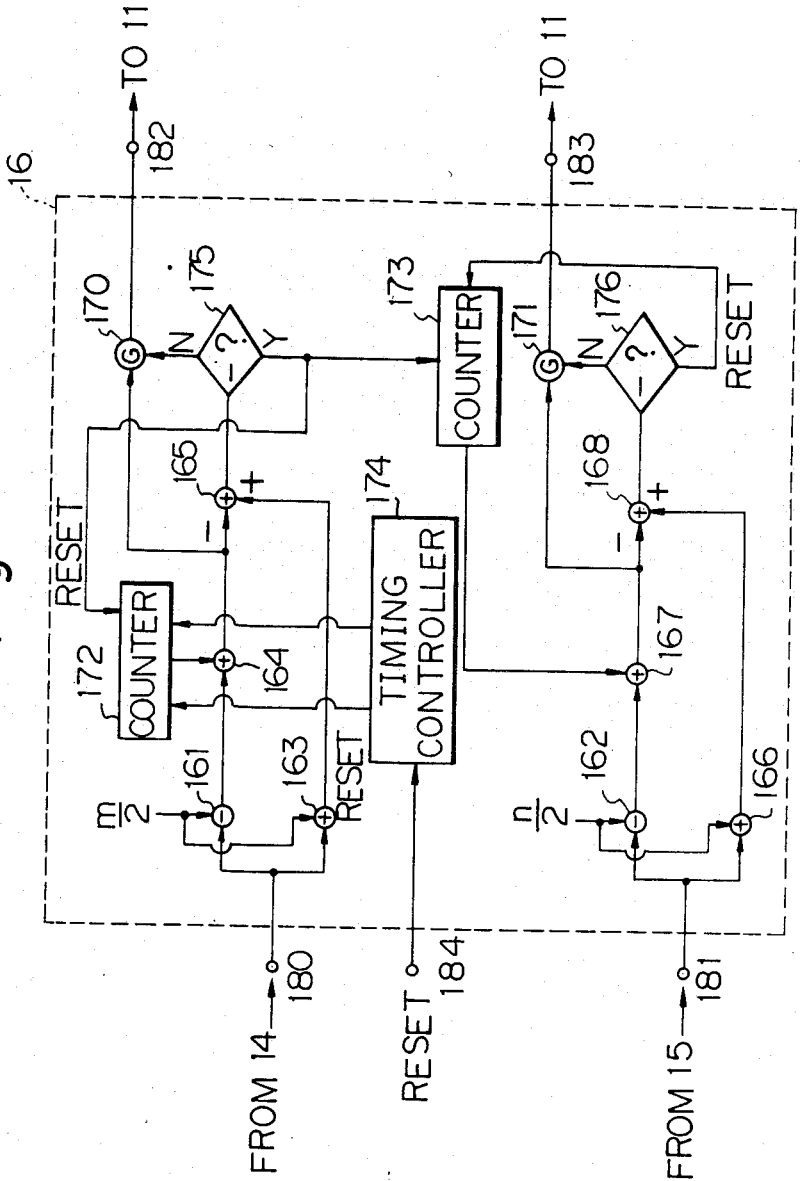
FIG. 7 is a block diagram of the pixel address generator in FIG. 6, FIG. 8 consisting of FIGS. 8A and 8B a block diagram is of the motion vector detector in FIG. 5.

FIG. 7 is a block diagram of a pixel address generator 16 in FIG. 6. In the figure, the numerals 161 and 162 are subtractors, 163 through 168 are adders, 170 and 171 are gate circuits, 172 and 173 are counters, 174 is a timing controller, 175 and 176 are decision circuits, 180, 181 and 184 are input terminals, 182 and 183 are output terminals. To the input terminals 180 and 181, the center addresses $x_0$ and $y_0$ of the present input block are applied. The subtractor 161 and the adder 163 provide $x_0-(m/2)$ and $x_0+(m/2)$, respectively, using the address $x_0$. The output of the subtractor 161 is applied to one input of the adder 164, which also receives the output of the counter 172, until the sum reaches $x_0+(m/2)$ (the adder 165 and the decision circuit 175 operate to determine whether the sum reaches that value or not), and the output of the adder 164 is applied to the output terminal 182 through the gate 170, as the pixel address x in the horizontal direction of a picture. The content of the counter 172 is incremented one by one by the timing controller 174 for each pixel. When the output of the decision circuit 175 is negative (when the output of the adder 165 exceeds $x_0+(m/2)$), the counter 172 is reset to zero. The address $y_0$ is also handled similar to the address $x_0$, except that the increment of the counter 173 is accomplished even when the output of the decision circuit 175 becomes negative (that is to say, even when one scanning line in a horizontal direction is processed), and the counter 173 is reset to zero when the output of the decision circuit 176 is negative (that is to say, when the output of the adder 168 exceeds $y_0+(n/2)$). The pixel addresses x and y in the range between $x_0-m/2$ and $x_0+m/2$, and $y_0-n/2$, and $y_0+n/2$, respectively, are applied to the terminals 182 and 183, respectively, and a block picture data is read out of the picture memory 1.

The memory address generator 11 in FIG. 6 provides the actual address of the picture memory 10 according to the input picture address signal which shows merely the location of a pixel on a two dimensional plane. A picture memory 10 is, for instance, a RAM (random access memory). It should be noted that structure of a picture memory 10 and a memory address generator 11 is conventional, and it is possible to use commercial ones.

Figure 8A:
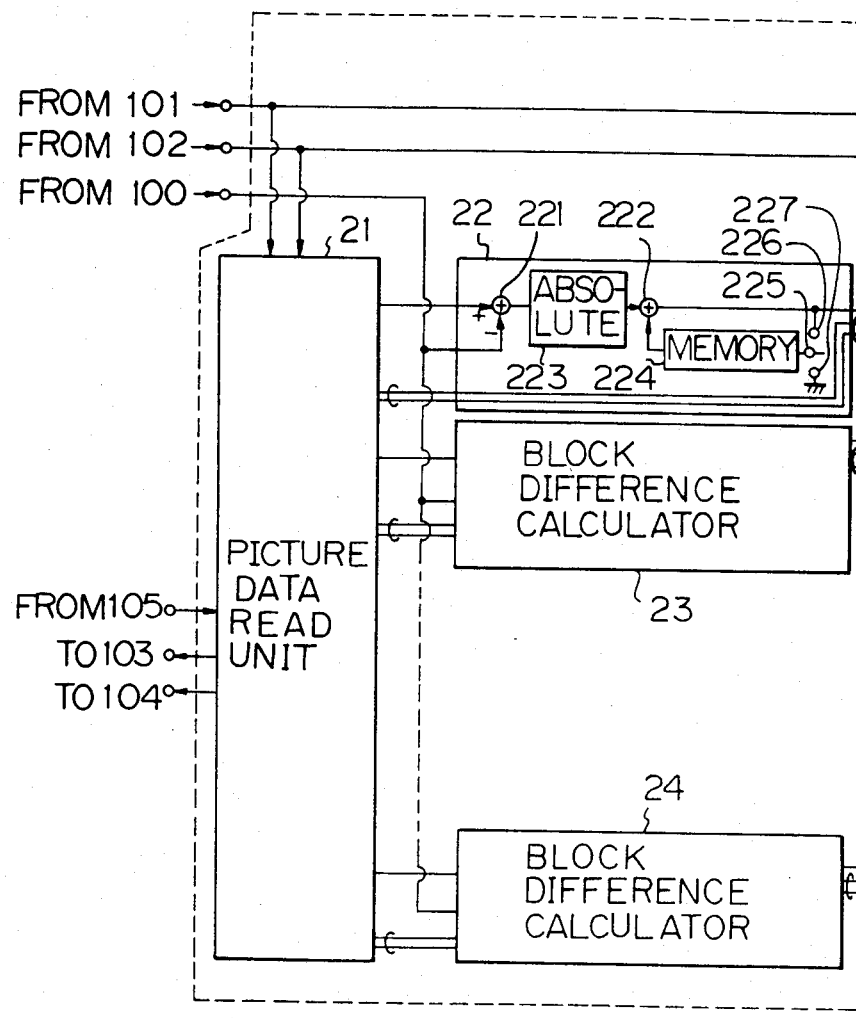
Figure 8B:
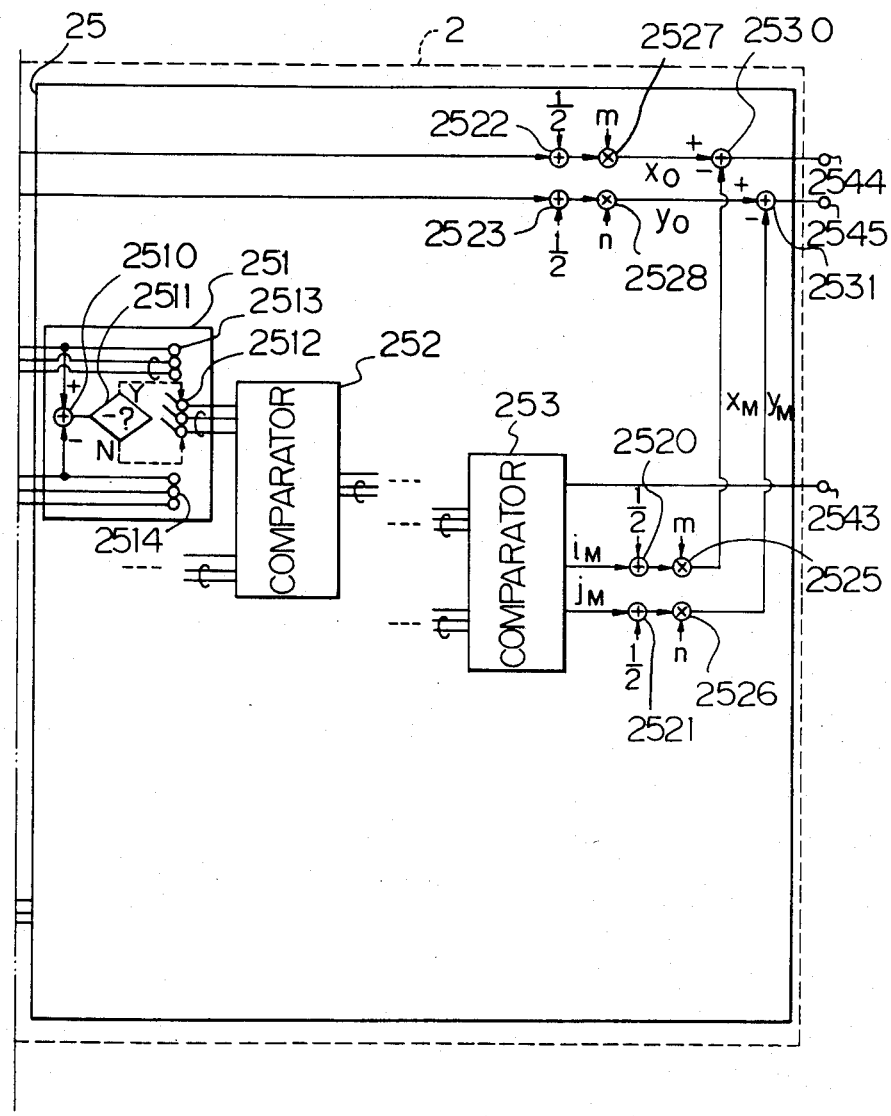

FIG. 8 is a block diagram of the motion vector detector 2 in FIG. 5. In the figure, the numeral 21 is a picture data read unit which reads a block of picture data out of the picture memory 1 according to the number i, j which shows the location of the present input block. The numerals 22, 23 and 24 are circuits for calculating a block difference, and 25 is a motion vector calculator which calculates a motion vector according to the minimum value of the block differences and the block location which gives said minimum value. The picture data read unit 21 reads P (integer) number of blocks, and the block difference calculators 22 through 24 calculate the block differences between each block and the present input block. In an actual system, P number of block difference calculators are provided, but only some of them are shown in FIG. 8 for the sake of simplicity. Then, the circuit 25 provides the minimum value of said block differences, and the motion vector which relates to said minimum value of the block difference, so that a destination block which is the most similar to the present input block is obtained.

Each portion of the block diagram is then described in detail.

Figure 9:
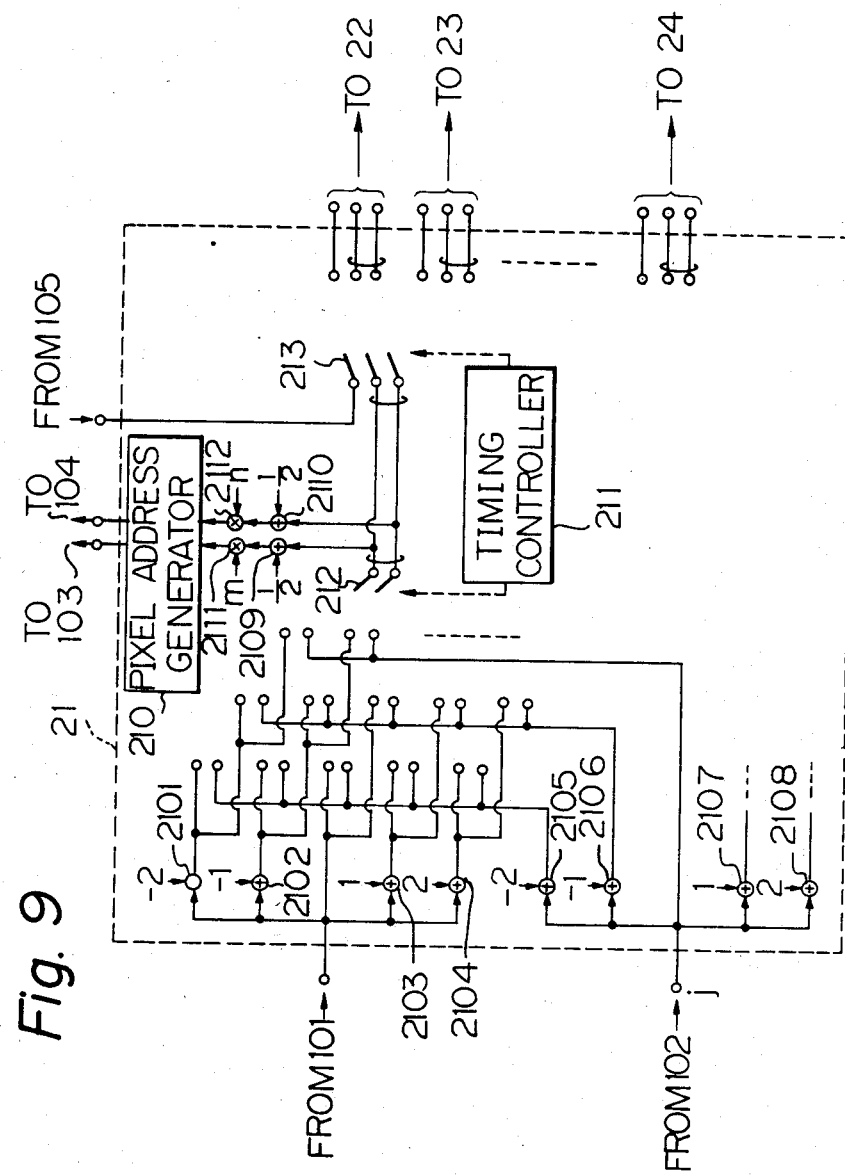
FIG. 9 is a block diagram of the picture data read unit in FIG. 8.

FIG. 9 is a block diagram of the picture data read unit 21 in FIG. 8. FIG. 9 shows the example in which 25 number of blocks each having m×n pixels are read out, that is to say, when the location of the present input block is (i,j), the blocks at the location (i−2, j−2)−(i+2, j+2) are read out. Although a block does not overlap with an adjacent block in the present example, it is of course possible that a block overlaps with adjacent blocks. In FIG. 9, the numeral 210 is a pixel address generator which provides a pixel address in a block according to a block number, 211 is a timing controller for switching blocks in order, and 212 and 213 are switches. 2101 through 2110 are adders, and 2111 and 2112 are multipliers. The adders 2101 through 2108 provide a pair of block numbers (i−2, j−2)−(i+2, j+2) according to the location number (i,j) of the present input block. For each block number, the timing controller 211 controls the switches 212 and 213 to read pixel data of each block. When a block number is applied through the switch 212, the adders 2109 and 2110, and the multipliers 2111 and 2112 converts said block number to the address of the center pixel of the block, and the converted address is sent to the pixel address generator 210. The structure of the pixel address generator 210 is the same as the circuit 16 in FIG. 7. A picture data read out of the picture memory 1 is sent to the block difference calculators 22 through 24, through the switch 213.

A block difference calculator 22 (23, or 24) in FIG. 8 is now described. The numerals 221 and 222 are adders, 223 is an absolute circuit, 224 is a memory for delaying a signal by one pixel time, 225 is a switch having terminals 226 and 227. The adder 221 provides a difference between the present input block and the block read out of the picture memory 1, and the absolute circuit 223 provides the absolute value of said difference. The output of the absolute circuit 223 is accumulated in the adder 222 by connecting the switch 225 to the terminal 226 for each pixel. When a new input block is handled, the switch 225 is coupled with the terminal 227 to reset the content of the memory 224.

The circuit 25 in FIG. 8 is now described. The detection of the minimum block difference is accomplished by comparing a present input block with one of 25 blocks having the numbers (i−2, j−2)−(i+2, j+2) to find a smaller block difference. The numeral 251 is the decision circuit for the above comparison. The numeral 2510 is an adder, 2511 is a decision circuit, 2512 is a switch, and 2513 and 2514 are terminals. The adder 2510 provides the block difference between two input blocks, and the decision circuit 2511 determines if the output of the adder 2510 is positive or negative. If it is positive, the switch 2512 is coupled with the terminal 2513, and if it is negative that switch is coupled with the terminal 2514. By repeating the above operation by using the comparators 251, 252, 253 et al. the minimum block difference and the related block number $i_M$, $j_M$ are obtained. The rest of the circuit 25 functions to provide a motion vector. The numerals 2520 through 2523, 2530, and 2531 are adders, and the numerals 2525 through 2528 are multipliers. The adders 2522 and 2523 receive the block number of the present input block, and said numbers are converted to the horizontal pixel address $x_0$ and the vertical pixel address $y_0$ through the multipliers 2527 and 2528. Simultaneously, the block number $i_M$, $j_M$ which gives the minimum block difference is converted to the horizontal pixel address $x_M$ and the vertical pixel address $y_M$ through the adders 2520 and 2521, and the multipliers 2525 and 2526. For $x_0$, $y_0$ and $x_M$, $y_M$, the adders 2530 and 2531 provide their differences. The outputs of the adders 2530 and 2531 are the horizontal component and the vertical component of the motion vector which is wanted, and are applied to the terminals 2544 and 2545, respectively. The minimum block difference is applied to the terminal 2543.

Figure 10:
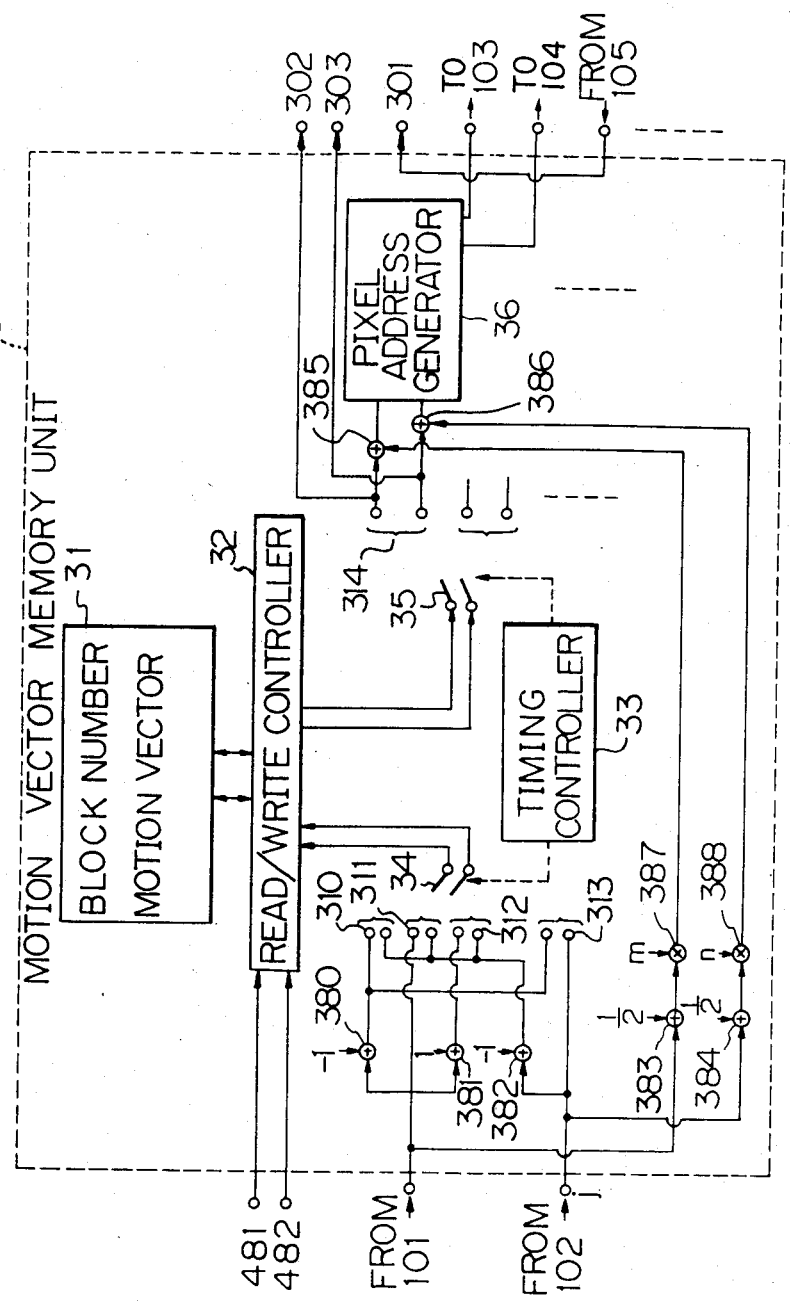
FIG. 10 is a block diagram of the motion vector memory unit in FIG. 5, and FIG. 11 consisting of FIGS. 11A and 11B is a block diagram of the motion vector correction unit in FIG. 5.

FIG. 10 is a block diagram of the motion vector memory unit 3 in FIG. 5. In the figure, the numeral 31 is a motion vector memory, 32 is a read/write controller for the memory 31, 33 is a timing controller, 34 and 35 are switches, 36 is a pixel address generator to read a block having m×n pixels out of the picture memory 1. The structure of the address generator 36 is the same as that of 16. The numerals 380 through 386 are adders, 387 and 388 are multipliers, 310 through 314 are terminals, 302 and 303 are output terminals for providing the value of the motion vector, 301 is the output terminal for providing picture data, and 481 and 482 are input terminals for providing a final motion vector which has been modified to the memory 31. The subtractors and the adders 380 through 382 process the block numbers i, j from the input terminals 101 and 102, to provide the converted block number (i-1, j-1), (i, j-1), (i+1, j-1), (i-1, j) which represent the adjacent blocks, and the converted ones are applied to the terminals 310 through 313. For those converted block numbers, the switches 34 and 35 which are controlled by the timing controller 33 facilitate to read the related motion vector out of the motion vector memory. The motion vector thus read out is applied to the terminals 302 and 303 through the terminal 314. The motion vector is also sent to the adders 385 and 386, which add the horizontal and vertical components of the motion vector to the horizontal address and the vertical address of the center pixel of the current input block denoted by the block number i, j. That center pixel address is obtained through the adders 383 and 384, and the multipliers 387 and 388. The output of the adders 385 and 386 represent the location of a block which is apart from the current input block by the value of motion vector in a field, and is applied to the pixel address generator 36. The structure of the circuit 36 is the same as that of the circuit 16 in FIG. 7, which has been already described.

Figure 11A:
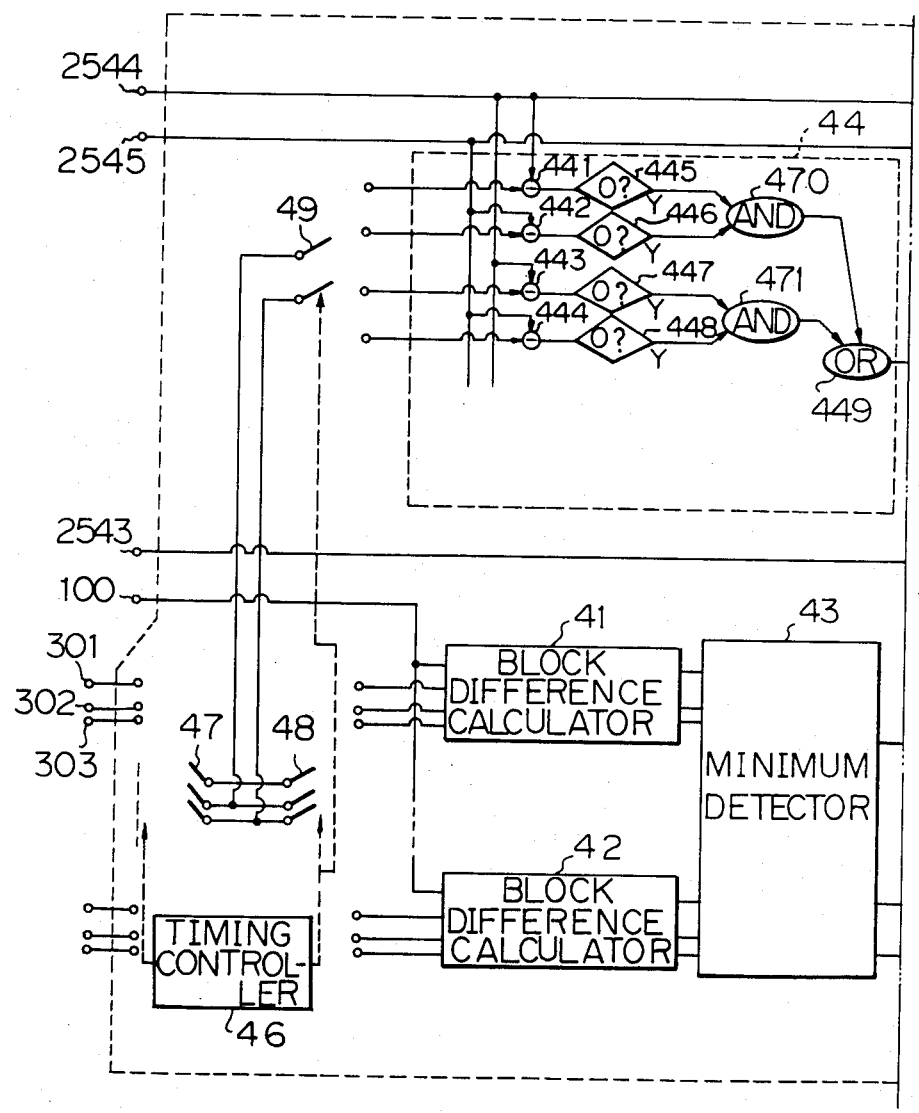
Figure 11B:
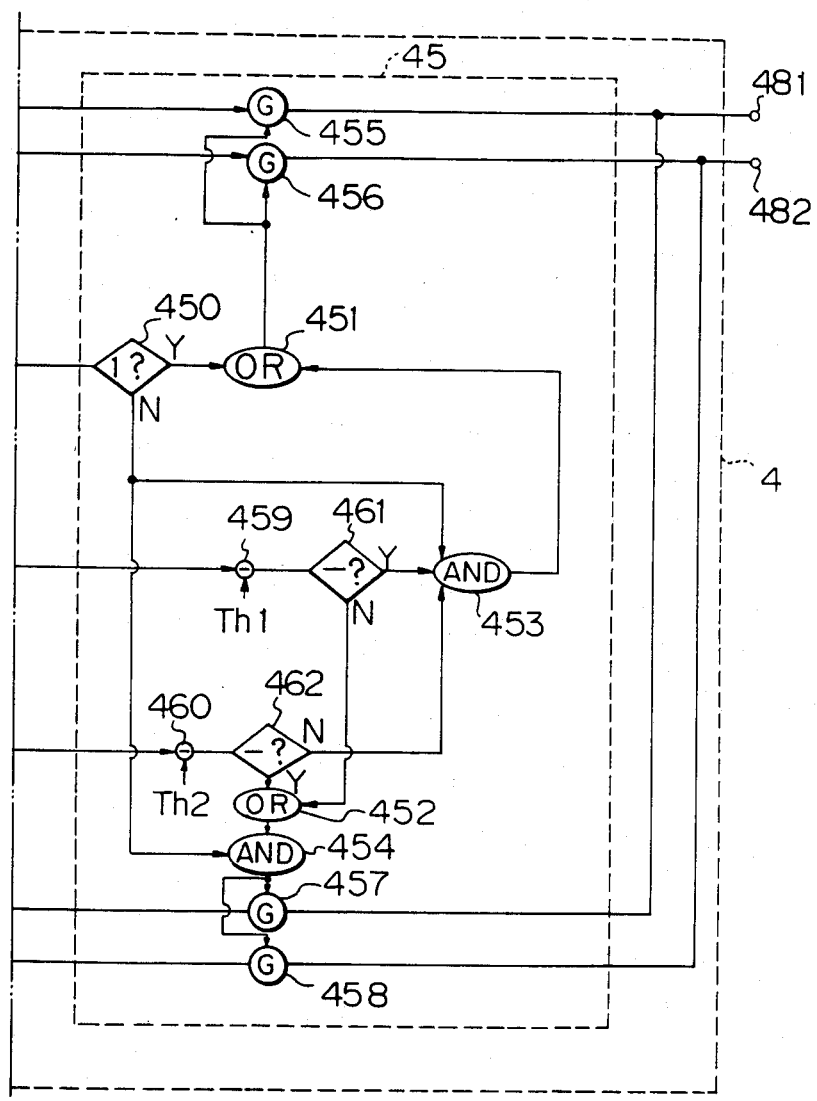

FIG. 11 is a block diagram of the motion vector correction unit 4 in FIG. 5. In FIG. 11, the numerals 41 and 42 are block difference calculators to provide a difference between a current input block and a block which is selected by using the contents of the motion vector memory 3 in the preceding frame. The structure of those calculators is the same as that of the circuit 22 in FIG. 8. The numeral 43 is the minimum detector to provide the minimum block difference and the related motion vector, and the structure of the circuit 43 is the same as that of the circuit 25 in FIG. 8. The numeral 44 is the coincidence detection circuit for motion vectors, 45 is a motion vector correction circuit. In the circuit 44, the numerals 441 through 444 are subtractors, 445 through 448 are decision circuits, 470 and 471 are AND circuits, and 449 is an OR circuit. In the circuit 45, the numeral 450 is a decision circuit, 451 and 452 are OR circuits, 453 and 454 are AND circuits, 455 through 458 are gate circuits, 459 and 460 are subtractors, 461 and 462 are decision circuits. The numeral 46 is a timing controller, 47 through 49 are switches, and 481 and 482 are output terminals.

For the adjacent block number provided through the terminals 301 through 303, the timing controller 46 switches the switches 47 through 49 synchronized with the block number and the pixel data. The minimum detector 43 provides the minimum value $S_{vp}$ relating to said $V_i$, and the related motion vector $V_p$. The coincidence circuit 44 tests if the motion vector $V_i$ of the adjacent block obtained through the switch 49 is equal to the motion vector $V_x$ obtained in the motion vector detector 2. The test is for instance accomplished by obtaining the differences in the horizontal direction and the vertical direction of the motion vectors $V_i$ and $V_x$ by using the subtractors 441 and 442, and checking whether the differences are zero or not by using the decision circuits 445 and 446. The AND circuit 470 also tests if both the horizontal component and the vertical component coincide. In repeating the above operation for each motion vector $V_i$, the OR circuit which receives the outputs of the AND circuits 470 and 471 provides the decision output 1 (=yes) to the motion vector correction circuit 45, when there exists a motion vector which is equal to $V_x$.

The motion vector correction circuit 45 functions to implement the adjustment or correction operation as shown in the table 1. The decision circuit 450 tests whether the output of the coincidence circuit 44 is 1(=yes) or not. When the result is "yes", the value $V_x$ is applied to the terminals 481 and 482 through the gate circuits 455 and 456. When the result is "no", the subtractor 459 provides the difference between $S_{Vx}$ and $T_{h1}$, and the decision circuit 461 tests if the difference is positive or negative. Also, the subtractor 460 provides the difference between $S_{Vp}$ and $T_{h2}$, and the decision circuit 462 tests if the difference is positive or negative. When $S_{Vx} < T_{h1}$, and $S_{Vp} \geq T_{h2}$ are satisfied, the AND circuit 453 provides the output signal, which opens the gate circuits 455 and 456 through the OR circuit 451, so that the value $V_x$ is applied to the terminals 481 and 482. On the other hand, in all the cases except $S_{Vx} < T_{h1}$ and $S_{Vp} \geq T_{h2}$, the OR circuit 452 provides the output signal, which opens the gate circuits 457 and 458 through the AND circuit 454 so that $V_p$ is applied to the terminals 481 and 482.

As mentioned above, according to the present invention, the motion vector which is obtained by a conventional manner is modified by using motion vector information of the adjacent blocks of the current input block, and the error of the detected motion vector is decreased. As a result, a motion vector between frames to indicate a movement of a moving object is detected correctly, and therefore, the performance of a motion picture processing and/or a coding system by using a motion vector is improved. In particular, a picture quality of a picture which is obtained by interpolating a scanning line by using a motion vector in an image signal coding system in for instance a television standard conversion system, and/or a general detection of a moving object is improved.

From the foregoing, it will now be apparent that a new and improved moving object detection system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A motion vector detection system for detecting motion of a moving object on a screen comprising:

a picture memory means (1) connected to a picture input for receiving and storing at least a frame of an input picture signal;

a motion vector detector means (2) including a first input (100) connected to said picture input for receiving a current frame block of the input picture signal and a second input (105) connected to said picture memory means for receiving a stored preceding frame block of the picture signal, said inputs being in the form of signals representing blocks of m×n pixels, m and n being integers, said motion vector detector means including means for calculating block differences from said block input signals, and comparator means for outputting a first output of a minimum value of block differences and a second output of the block location that gives said minimum value;

a motion vector memory unit (3) connected to said picture memory means (1) and said motion vector detector means (2) to receive and store calculated motion vector outputs for at most one frame duration; and a motion vector correction unit (4) connected to said picture input, said motion vector detector means (2) and said motion vector memory unit (3) for comparing inputs therefrom and correcting the motion vector of the current input block obtained from said motion vector detector means and providing an an output a corrected detected motion vector;

said comparison being made by calculating block differences of adjacent blocks using previous detected motion vectors stored in said motion vector memory unit (3) and the motion vector output of said motion vector detector means (2), and said corrected detected motion vector being selected from among a previous detected motion vector and the motion vector obtained by said motion vector detector means (2) according to predetermined conditions.

2. A motion vector detection system according to claim 1, wherein said motion vector correction unit (4) comprises:

means for receiving a motion vector $V_x$ of the current input block calculated by said motion vector detector means (2) and means for calculating a block difference $S_{Vx}$ between the current input block and the block obtained from the said picture memory means (1) by using said motion vector $V_x$;

means for providing motion vectors $V_r(V_1, V_2 \ldots)$ of the adjacent blocks, and for calculating block differences $S_{v1}, S_{v2}, S_{v3} \ldots$ between the current input block and the blocks obtained from said picture memory means (1) by using said motion vectors $V_1, V_2, V_3 \ldots$;

means for selecting a motion vector $V_p$, from among the motion vectors used to calculate $S_{v1}, S_{v2}, S_{v3} \ldots$, which gives a minimum block difference value; and means for correcting said motion vector $V_x$ to said motion vector $V_p$ when neither the condition that said motion vector $V_x$ is equal to any of the motion vectors $V_r(V_1, V_2 \ldots)$ nor the condition that the difference $S_{Vx}$ for said motion vector $V_x$ is less than a first predetermined value $T_{h1}$ and a calculated block difference $S_{Vp}$ for said motion vector $V_p$ is not smaller than a second predetermined value $T_{h2}$ is satisfied.

3. A motion vector detection system according to claim 2, wherein $T_{h2}$ is larger than $T_{h1}$.

4. A motion vector detection system according to claim 2, wherein a number of said adjacent blocks consists of 4 blocks.

5. A motion detection system according to claim 1, wherein each of said blocks has 25 pixels.

* * * * *